United States Patent [19]
Kraus

[11] 3,760,646
[45] Sept. 25, 1973

[54] ROTARY MOTION TRANSMITTING DEVICE

[75] Inventor: Charles E. Kraus, Austin, Tex.

[73] Assignee: Excelermatic Inc., Pittsburgh, Pa.

[22] Filed: Feb. 22, 1972

[21] Appl. No.: 227,776

[52] U.S. Cl. ............................................. 74/200
[51] Int. Cl. ....................................... F16h 15/08
[58] Field of Search ................................... 74/200

[56] References Cited
UNITED STATES PATENTS

| 3,410,146 | 11/1968 | Nordeen | 74/200 |
| 2,971,390 | 2/1961 | Rygelis et al. | 74/200 |
| 3,008,337 | 11/1961 | Kraus | 74/200 |
| 3,653,272 | 4/1972 | Scheiter | 74/200 |
| 2,962,909 | 12/1960 | Jaquith et al. | 74/200 |

*Primary Examiner*—Leonard H. Gerin
*Attorney*—T. L. Bowes

[57] ABSTRACT

In a rotary motion transmission device having coaxial input and output shafts carrying oppositely disposed toric elements and having a rotary motion transmitting hollow spool disposed between and frictionally engaging the toric elements, one of the toric elements is mounted for rotation with one of the shafts but axially supported by the other shaft extending through the hollow spool such that the forces required to engage the toric elements with the motion transmitting means are transmitted through the other shaft only.

16 Claims, 4 Drawing Figures

ROTARY MOTION TRANSMITTING DEVICE

BACKGROUND OF THE INVENTION

Rotary motion transmission devices are known in various forms. U.S. Pat. Nos. 2,784,604 and 2,881,622, for example, show transmissions having two or more wheels in frictional engagement with each other and means for infinitely varying the transmission ratio by changing the circles of contact between the wheels. Such transmission devices in general operate satisfactorily, but they have relatively large friction losses especially because the axis of each of the friction wheels is outside the circle of contact of the other friction wheel.

U.S. Pat. Nos. 2,850,910; 2,850,911 and 3,299,744 describe variable speed power transmissions in which oppositely disposed toric elements have a number of tiltable friction rollers disposed therebetween. These arrangements permit the transmission of relatively large torques but all the bearings are subject to relatively large axial forces. Also, these conventional arrangements require a relatively elaborate control structure for properly positioning the friction rollers.

U.S. Pat. Nos. 3,261,219 and 3,261,220 describe speed changing power transmission devices in which spherical input and output traction disks are disposed opposite each other and connected to input and output shafts, respectively, and a spool is disposed in the space enclosed by the traction disks. The spool is in engagement with the input and output traction disks for transmitting motion from the input to the output traction disk, and is mounted pivotally to permit the circles of contact between the spool and the input and output traction disks to be changed so as to vary the speed transmission ratio. This arrangement is very simple and compact, but the bearings and the housing are subject to relatively large axial forces and the loading cam structure for forcing the spool in engagement with the traction disks experiences eccentric loading forces. This causes early wear of the bearings and the loading cam structure and disturbs the speed transmission ratio regulation.

SUMMARY OF THE INVENTION

The present invention overcomes these problems with a rotary motion transmitting device having coaxial input and output shafts carrying oppositely arranged toric elements and motion transmitting means disposed between, and in frictional engagement with, the toric elements. One of the elements is mounted for rotation with one of the shafts but is axially supported by the other shaft which extends through the hollow spool, so that the forces required for the frictional engagement of the toric elements with the a motion transmitting hollow spool are transmitted through said other shaft.

The motion transmitting means is preferably a spool journaled in a carrier mounted pivotally to permit variation of the motion transmission ratio between the toric elements which are forced in engagement with the spool by oppositely disposed cam faces associated with one of the toric elements and the other shaft.

In the preferred arrangement, the toric elements have essentially spherical inner surfaces with a common center of curvature through which also the pivot axis of the spool carrier extends. Also, preferably the spool has an axial opening and the other shaft extends through the spool.

BRIEF DESCRIPTION OF THE DRAWINGS

The invention will become more readily apparent from the following description of an embodiment thereof shown, by way of example only, in the accompanying drawings, in which:

As shown in FIG. 1, the transmission has a housing 1 consisting of a central part 2, a front part 3 mounted on one end, and a rear part 4 mounted on the other end of the central part 2. An input shaft 5 extends through the front part 3 and is rotatably supported therein by a bearing 6, and an output shaft 7 extends through the rear part 4 alignment with the input shaft 5 and is rotatably mounted at the exit end by a bearing 8. One of the shafts 5, 7 (as shown, the input shaft 5) extends through the central part 2 of the housing and into the other shaft, (as shown, the output shaft 7) wherein it is supported by a bearing 9. The input shaft 5 carries an input traction disk 10, and the output shaft 7 carries an output traction disk 11. The traction disks 10 and 11 are disposed opposite each other in the central part 2 of the housing 1 and have spherical inner surfaces whose centers of curvature substantially coincide. The output traction disk 11 is mounted for rotation with a drum 12 disposed at the inner end of the output shaft 7 and is radially supported inside the central housing part 2 by an output disk radial bearing 13. Axial support is given to the output traction disk by an axial thrust bearing 14 held by a bearing disk 15 which is secured to the input shaft 5 within the drum 12.

Figure 1:
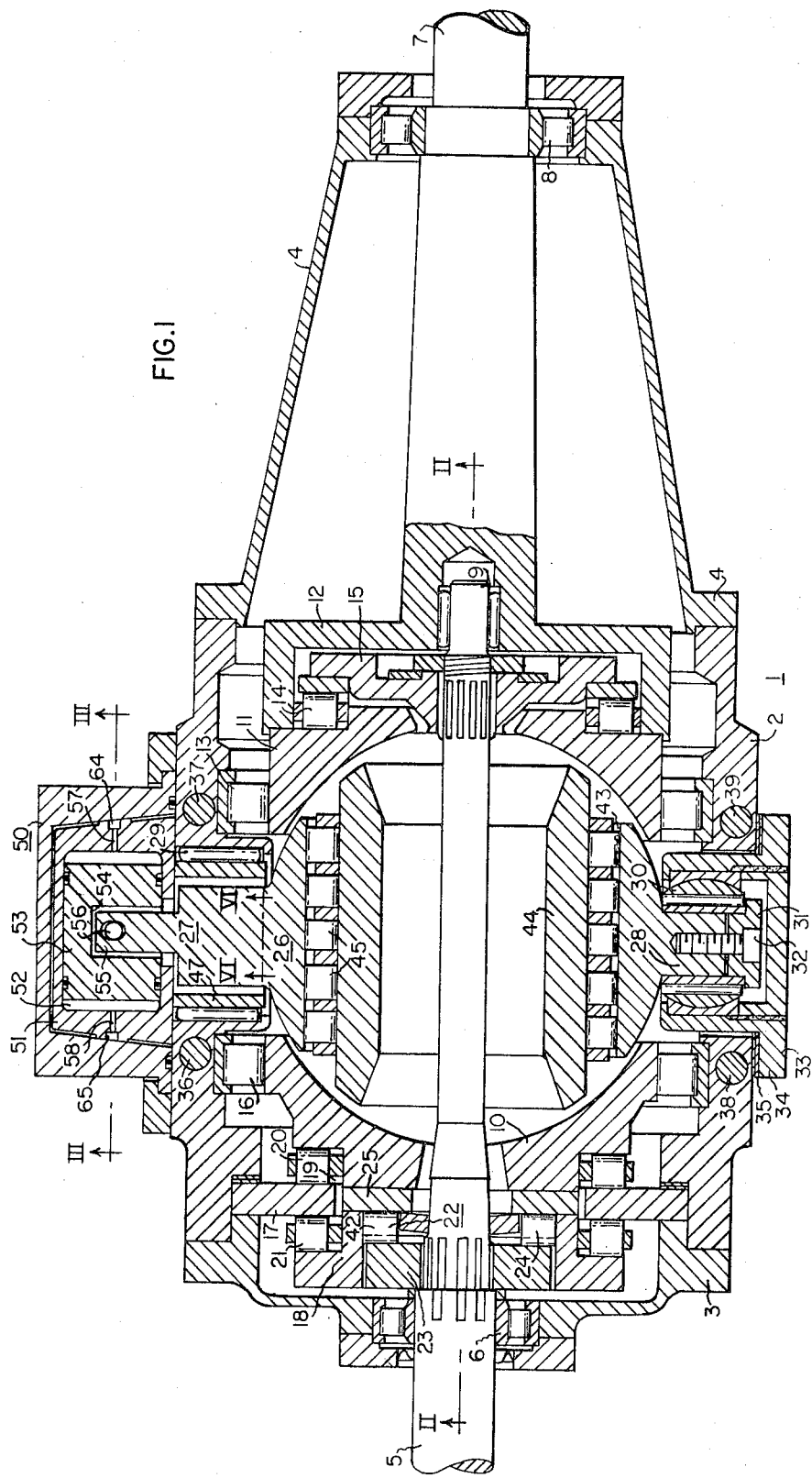
FIG. 1 is a cross-sectional view of the motion transmission device along the axis of input and output shafts.

The input traction disk 10 is radially supported within the central housing part 2 by an input disk radial bearing 16. To provide firm axial positioning for the input disk 10 with respect to the housing 1, an annular thrust plate 17 is mounted on the housing and extends radially inwardly into an annular groove 19 formed in an axial extension 18 of the input traction disk 10. Axial thrust bearings 20 and 21 are disposed at each side of the thrust plate 17 in the groove 19. The input traction disk 10 is mounted for rotation with the input shaft 5 by a loading cam structure 22. The loading cam structure 22 consists of a loading cam disk 23 which is firmly connected to the input shaft 5 and has axial cam faces 24 abutting axial cam faces 42 formed on an annular pressure plate 25 connected to the input traction disk 10. The cam faces may be two sided so that torque transmission in either direction is possible.

Disposed in the spherical space enclosed by the two traction disks 10 and 11 is a spool carrier 26 which is supported in the central part 2 of the housing for pivotal movement by trunnions 27 and 28 and trunnion bearings 29 and 30 about an axis which is essentially normal to the axis of the input and output shafts and passes essentially through the center of curvature of the inner surfaces of the disks 10 and 11. Bearing 30 is a pivot bearing held in engagement with the trunnion 28 by a washer 31 secured to the trunnion 28 as by a bolt 32. The outer bearing structure is supported in a trunnion housing 33 having a flange 34 with which it is mounted on the housing part 2. Shims 35 are disposed between the flange 34 and the housing part 2 to locate the trunnion 28 and the spool carrier 26 in axial direction with respect to the pivot axis of the spool carrier.

Figure 4:
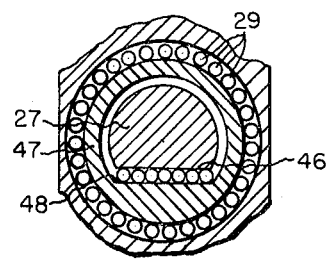
FIG. 4 is a cross-sectional view along lines IV—IV of FIG. 1, showing the support arrangement of the carrier of the spool adjacent the control structure.

To facilitate assembly of the transmission the central housing part 2 is preferably split axially and held together by stress bolts 36, 37, 38 and 39. The spool carrier 26 has a cylindrical opening 43 having an axis which extends normal to but is slightly displaced from the pivot axis of the spool carrier 26 as shown at $d$ in FIG. 2. A hollow spool 44 is rotatably supported in the cylindrical opening 43 by bearings 45 such that the input shaft 5 extends through the hollow spool 44. The spool 44 is of such size and length that it engages with its outer rims the input traction disk 10 and the output traction disk 11 but only at one side of the shaft extending therethrough because of the displacement of its axis from the axis of the spool carrier 27 to transmit rotational movement of the input traction disk 10 to the output traction disk 11. Engagement with the input and output traction disks at one side of the shaft forces the spool 44 and the spool carrier 26 toward the other side on which the trunnion 27 is provided with a flat surface 46, as best shown in FIG. 4. The inner ring 47 of the roller bearing 29 has a corresponding flat surface 48 and roller bearing structure is disposed between the two flat surfaces to support the trunnion 27 in the bearing 29 for slight translatory movement as required for the induction of a change of the transmission ratio, as will be explained later in the description of the operation of the transmission.

Figure 3:
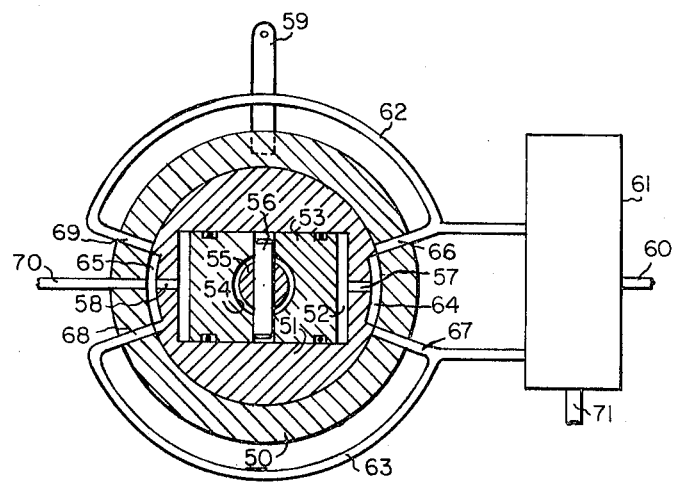
FIG. 3 is a cross-sectional view along lines III—III of FIG. 1, showing a control structure for adjusting the speed transmission ratio.

For power pivoting of the spool carrier 26 a control turret 50 is rotatably mounted on the central housing part 2 over the trunnion 27. Disposed in the control turret 50 is a control disk 51 having a cylindrical opening 52 whose axis extends substantially normal to the axis of the spool carrier 26 in a plane parallel to the flat surface 46 of the trunnion 27. The cylindrical opening 52 receives a precess piston 53 which has a recess 54 formed therein. The trunnion 27 has an extension 55 which extends into the recess 54 and is connected to the piston 53 by a bolt 56 extending normal with respect to the flat surface 46 of the trunnion 27. Side forces may be applied to the trunnion 27 by admission of pressurized fluid to the cylindrical opening 52 at either side of the piston 53 through passages 57 or 58. Admission of such fluid is controlled by angular positioning of the turret 50, as best shown in FIG. 3. To facilitate positioning of the turret 50, the turret has a control lever 59 attached thereto. Pressurized fluid is admitted to the turret through a pressurized fluid supply line 60 which is connected to a solenoid operated forward-reverse valve 61 which is preferably mounted on the turret 50. The valve 61 is adapted to connect the supply line 60 to either one of the hydraulic passages 62 and 63 which preferably extend through the walls of the turret 50. The hydraulic passages 62 and 63 provide communication with the passages 57 and 58 through annular passage sections 64 and 65. The terminal sections 66 and 67 of the passage 62 are disposed at one end of the annular passage sections 64 and 65 and the terminal sections 68 and 69 of the passage 63 are disposed at the other end of the annular passage sections 64 and 65 such that the terminal sections 66, 67, 68 and 69 are normally substantially covered by the control disk 61. For automatic ratio control, a pressure tap 70 may be connected on either side to provide communication with passages 57 and 58.

This arrangement provides a circular control servo valve which operates in the following manner: When tthe drive shaft rotates in one direction the hydraulic passage 62, for example, is connected to the pressurized fluid supply line 60 whereas the hydraulic passage 63 is connected to a drain 71. For rotation of the drive shaft in the opposite direction, passage 63 is connected to the hydraulic fluid supply line 60 and passage 62 is connected to the drain 71. Assuming now that the passage 62 is connected to the supply line 60, rotation of the turret in one direction such that passage sections 66 and 68 are uncovered will permit pressurized fluid to enter the cylinder 52 and move the piston 53 sidewise. Passage 68 permits the fluid at the other side of the piston to flow to the drain 71. Since the piston is connected to the trunnion 27, the trunnion is moved laterally to one side such that the pivot axis of the spool carrier 26 is slightly off its position normal to the axis of the input and output shafts. This causes rotation of the spool carrier and of the control disk 51 in a direction to cover the passage sections 66 and 68. Rotation of the control turret in the other direction will uncover passage sections 67 and 68 so that pressure is applied to the other end of the cylinder and the trunnion 27 of the spool carrier is moved to the other side until the spool carrier 26 has been pivoted far enough in the other direction to cause the passage sections 67 and 68 to be covered again by the control disk 51.

Operation of the transmission is as follows: Power is transmitted from the input shaft 5 to the loading cam disk 23 and across the cams to the input traction disk 10 which rotates with the input shaft 5. In transmitting torque across the loading cam structure 22, the cam disk 23 and pressure plate 25 are forced apart so that the output traction disk 11 is pulled toward the input traction disk 10, thereby forcing the rims of the spool 44 in firm frictional engagement with the input and output traction disks 10, 11. The input traction disk 10 then drives the spool 44 and the spool 44 drives the output traction disk 11 to which the output shaft 7 is connected. The larger the torque, the greater is the force with which the input and output traction disks 10, 11 are forced toward each other, and the firmer is the frictional engagement between the spool 44 and the input and output disks 10, 11. The axial forces for such frictional engagement, however, are transmitted solely through the portion of the input shaft 5 which extends between the cam disk 23 and the bearing disk 15. No forces are transmitted through the housing.

Figure 2:
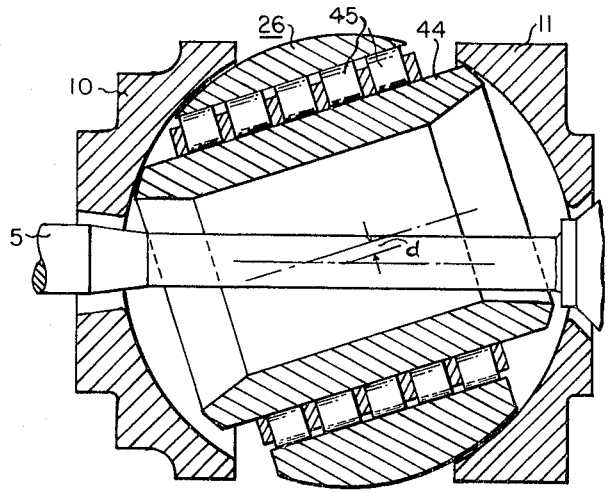
FIG. 2 is a cross-sectional view along lines II—II of FIG. 1, showing toric elements forming input and output traction disks enclosing the rotary motion transmitting spool.

The speed transmission ratio is adjusted by pivoting the spool carrier 26 about its pivot axis. If the spool carrier 26 is positioned, for example, as shown in FIG. 2 the output shaft 7 will rotate at substantially lower speed than the input shaft 5. If the axis of the spool 44 is parallel to the axis of the input and output shafts 5, 7, input and output shafts rotate at the same speed and if the contact circle of the input traction disk 10 with the spool is larger than the contact circle of the output traction disk 11 with the spool, the speed of the output shaft is larger than the speed of the input shaft.

As long as the axis of the spool carrier 26 remains normal to the axis of the input and output shafts 5, 7, the spool 44 rolls along the momentary contact circles with the input and output traction disks 10, 11. When the spool carrier 26 is tilted by piston 53 the rims of the spool 54 climb to larger diameter contact circles at one traction disk and at smaller diameter contact circles at the other traction disk until the pivot axis of the spool carrier 26 is again brought to a position normal to the axis of input and output shafts 5, 7.

Assuming, for example, the traction disks 10, 11 rotate in a direction wherein their top portions, as shown in FIG. 2, move to the front (forward), movement of the piston 53 to the left will cause the spool rims to climb to a smaller circle of contact with the input traction disk 10 and to a larger circle of contact with the output traction disc 11, thereby decreasing the speed of the output shaft 7. However, if the disks rotate in the opposite direction (reverse), the same lateral movement of the piston 53 will cause a change of the transmission ratio in the opposite sense. Therefore, whenever the direction of movement is changed between forward and reverse, the solenoid operated valve 6 connects the pressurized fluid supply line 60 to the corresponding one of the hydraulic passages 62 and 63 and connects the other of the passages 62 and 63 to the drain 71.

With this arrangement, all of the forces required to engage the spool with the traction disks are transmitted through the shaft which extends through the spool, no such forces being transmitted through the housing. This reduces the load on practically all bearings. The thrust bearing (14) on the other hand, which takes up the axial forces, is subjected to only a small relative velocity as both, the input and output shafts, always rotate in the same direction. Furthermore, the spool is a solid tubular structure which is not subjected to twisting, and the spool bearings are subject solely to radial forces.

Also, for a changing of the transmission ratio only a relatively small force is necessary to move the end of the spool carrier slightly laterally. The spool then walks to the desired circles of contact with the input and output traction disks.

Finally, the arrangement according to the present invention is relatively simple, inexpensive to manufacture, and reliable in operation.

The invention, however, is not restricted to the embodiment described. For example, although the input shaft is shown to extend through the spool, it may be the output shaft which extends through the spool, with the thrust bearing and the cam assembly aranged accordingly.

Although it is preferred that the traction disks have the same radius of curvature, they may have a somewhat different radius of curvature provided, of course, that they have both about the same center of curvature.

In the arrangement as shown in the drawings, the shaft portion extending through the spool transmits only axial forces. It could also be used to transmit part of the torque if the output shaft were hollow and the input shaft extended fully through the output shaft. At its free end the input shaft may then have a sun gear whereas the output shaft may have a carrier with planet pinions engaging the sun gear, and an orbit gear may be mounted on a final output shaft, or the orbit gear may be connected to the output shaft and the planet pinion carrier mounted on the final output shaft. With such an arrangement, only part of the torque is transmitted through the spool, the other part being transmitted through the input shaft extension.

The control turret is required, of course, only for manual transmission ratio change. Fluid pressure supply lines can be connected directly to the cylinder at each end thereof provided admission of the pressurized fluid is controlled by some other means as it may be desirable for example, for fully automatic transmission ratio change.

The spool carrier could also be forced to a tilted position by a spring, the spring forces being adjustably offset by pressurized fluid or vacuum operated means.

As shown in the drawings axial support for the toric elements and the spool 44 relative to the housing 1 is provided by axial thrust bearings 20 and 21; however, it is noted that axial positioning of the toric elements and the associated input and output shafts could be provided by the spool carrier if the spool were supported by the carrier to permit no axial movement relative to the carrier.

What we claim is:

1. In a rotary motion transmitting device having coaxial input and output shafts, and oppositely disposed toric elements supported by the respective shafts, a motion transmitting hollow spool rotatably supported between, and having outer rims which are in frictional engagement with, the opposed surfaces of said toric elements at one side of said shafts, one of said toric elements being mounted for rotation with one of said shafts and the other toric element being supported for rotation with the other shaft, said other shaft extending through said hollow spool for axially supporting said one toric element, and an axial loading means adapted to force the toric elements toward each other and into firm engagement with said motion transmitting spool upon transmission or a torque through said shafts.

2. A rotary motion transmitting device as defined in claim 1, wherein said axial loading means is a cam structure having oppositely disposed cam faces associated with the other toric element and said other shaft.

3. A rotary motion transmitting device as defined in claim 1, wherein said spool is journaled in a carrier supported for pivotal movement about an axis which is essentially normal to a plane which includes the axis input and output shafts to permit changing of the motion transmitting ratio.

4. A rotary motion transmitting device as defined in claim 3, wherein said toric elements have spherical inner surfaces with a common center of curvature, the pivot axis of said carrier extending essentially through said common center of curvature.

5. A rotary motion transmitting device as defined in claim 3, wherein said carrier is supported to permit tilting thereof in a plane defined by the pivot axis of said carrier and the axis of said shafts, said spool, upon tilting of said carrier during operation of the device, walking to different circles of engagement with said toric elements thereby changing the angular position of the carrier.

6. A rotary motion transmitting device as defined in claim 5, wherein said carrier has a first trunnion journaled in a spherical bearing structure and opposite the first trunnion a second trunnion having a translatory bearing structure to permit said tilting, said translatory bearing structure being disposed, together with the second trunnion, in a rotary bearing structure.

7. An arrangement as claimed in claim 6, wherein said second trunnion has an extension projecting into and being engaged by a piston disposed in a cylinder having an axis substantially parallel to the spool axis for effecting said translatory movement of the second trunnion.

8. A device as claimed in claim 7, wherein said cylinder is formed in a control disk which is rotatably mounted in a control turret, and wherein said piston is connected to the trunnion extension by a bolt to cause rotation of the piston and the control disk together with the spool carrier, said control disk having a circumferential passage section at each end of the cylinder in communication with the adjacent cylinder end, said control turret having fluid passages at the opposite ends of each circumferential passage section such that the fluid passages are normally covered by the control disk, each pair of circumferentially adjacent fluid passages communicating with opposite cylinder ends being commonly connected to a forward-reverse valve adapted to connect one pair of fluid passages to a source of pressurized fluid and the other pair to a drain to permit control of the transmission ratio for rotation of the shafts in one direction, and to connect the other pair of fluid passages to the pressurized fluid source and the one pair to the drain to permit control of the transmission ratio for rotation of the shafts in the opposite direction.

9. An arrangement as claimed in claim 8, including a pressure tap at the circumferential fluid passage at either end of the cylinder.

10. A rotary motion transmitting device as defined in claim 1, wherein said toric elements are disposed in a housing and supported at their outer rims by bearings mounted in said housing.

11. A rotary motion transmitting device as defined in claim 10, wherein said other toric element is axially supported in said housing by an axial thrust bearing structure, said spool being supported to permit axial movement thereof relative to said carrier.

12. A rotary motion transmitting device with infinitely variable transmission ratio, said device including coaxial input and output shafts carrying oppositely disposed toric elements and a spool-type motion transmitting means frictionally engaging the opposed surfaces of said toric elements and being journaled in a spool carrier supported for pivotal movement about an axis which is essentially normal to a plane including the axis of the input and output shafts and for tilting in a tilting plane which contains the pivot axis of the spool carrier and is parallel to the axis of the spool-type motion transmitting means.

13. A rotary motion transmitting device as defined in claim 12, wherein said carrier has a first trunnion journaled in a spherical bearing structure and opposite the first trunnion a second trunnion having a translatory bearing structure to permit said tilting, said translatory bearing structure being disposed together with the second trunnion in a rotary bearing structure.

14. A rotary motion transmitting device as defined in claim 13, wherein said second trunnion has an extension projecting into and being engaged by a piston disposed in a cylinder having an axis substantially parallel to the spool axis for effecting said translatory movement of the second axis for effecting said translatory movement of the second trunnion.

15. A rotary motion transmitting device as defined in claim 14, wherein said cylinder is formed in a control disk which is rotatably mounted in a control turret, and wherein said piston is connected to the trunnion extension by a bolt to cause rotation of the piston and the control disk together with the spool carrier, said control disk having a circumferential passage section at each end of the cylinder in communication with the adjacent cylinder end, said control turret having fluid passages at the opposite ends of each circumferential passage section such that the fluid passages are normally covered by the control disk, each pair of circumferentially adjacent fluid passages communicating with opposite cylinder ends being commonly connected to a forward-reverse valve adapted to connect one pair of fluid passages to a source of pressurized fluid and the other pair to a drain to permit control of the transmission ratio for rotation of the shafts in one direction, and to connect the other pair of fluid passages to the pressurized fluid source and the one pair to the drain to permit control of the transmission ratio for rotation of the shafts in the opposite direction.

16. A rotary motion transmitting device as defined in claim 15, including a pressure tap at the circumferential fluid passage at either end of the cylinder.

* * * * *